United States Patent [19]

Borg

[11] Patent Number: 4,507,086
[45] Date of Patent: Mar. 26, 1985

[54] TURRET SHAKER MECHANISM

[75] Inventor: Henry A. Borg, Romeo, Mich.

[73] Assignee: The United States of America as represented by the Secretary of the Army, Washington, D.C.

[21] Appl. No.: 611,572

[22] Filed: May 18, 1984

[51] Int. Cl.³ .............................................. G09B 9/04
[52] U.S. Cl. ........................................ 434/29; 434/58
[58] Field of Search ....................... 434/29, 55, 58, 62

[56] References Cited
U.S. PATENT DOCUMENTS 3,295,224 1/1967 Cappel .................................. 434/58
3,984,924 10/1976 Myles et al. .......................... 434/29

FOREIGN PATENT DOCUMENTS 1268522 5/1968 Fed. Rep. of Germany ........ 434/62

Primary Examiner—William H. Grieb
Attorney, Agent, or Firm—Peter A. Taucher; John E. McRae; Robert P. Gibson

[57] ABSTRACT

A motion simulator for oscillating (shaking) a tank turret. Multiple fluid cylinders are used to produce elevational, roll, pitch and yaw movements of the turret. An additional fluid cylinder imparts rotational motion to the turret in the azimuth plane.

13 Claims, 6 Drawing Figures

TURRET SHAKER MECHANISM

GOVERNMENT INTEREST

The invention described herein may be manufactured, used, and licensed by or for the Government for governmental purposes without payment to me of any royalty thereon.

SUMMARY OF THE INVENTION

This invention relates to a motion simulator or shaker for heavy equipment (e.g. a tank turret). The simulator can be used to test equipment and/or crew performance. As used with tank turrets, the invention is designed to duplicate conditions encountered by a military tank traveling over rough terrain at varying speeds and acceleration/deceleration rates.

To thoroughly test componentry in a tank turret the turret should be exposed to stresses equal to or greater than stresses occurring during actual use. Actual field operations using complete tanks are costly and time-consuming, due to such factors as the need for a complete crew to run the vehicle on a round-the-clock basis, possible change or degradation of the test facility during a given test and between tests, the cost of fuel, vehicle wear and/or possible breakdown, and transportation of the entire tank to/from the test site. Additionally, field operations are not completely reproducible (from one test to subsequent tests) due to possible changes in the testing terrain surface and/or differences in the ways in which different drivers operate the tanks.

The present invention contemplates a laboratory shaker apparatus on which a tank turret can be mounted (separate from the vehicle hull and hull components). The apparatus comprises a turret-support platform and a number of separate fluid cylinders (or their equivalent) arranged to impart vertical oscillatory forces to three (or more) circumferentially spaced areas on the platform. The platform (and supported turret) is thereby oscillated vertically and also tiltably around its points of connection with the fluid cylinders. Other fluid cylinders are arranged to impart rotational oscillatory forces to the platform or to the turret. The aim of the invention is to simulate forces that would be encountered by the turret incident to actual travel of a complete tank over rough terrain at varying speeds and changes in speed. Turret rotation during the laboratory testing simulates actual turret motion required to accelerate/decelerate the main gun incident to target acquisition-firing cycles.

The oscillatory force inputs can be controlled by electrical signals derived from a programmer tape or disc system (not part of this invention). The shaker mechanism is used principally to test the structural integrity of hardware components installed in the turret, e.g. range finder, computer, automatic ammunition loader, etc. If the turret is outfitted with the usual basket it should be possible for a human crew to operate the turret equipment while the shaker mechanism is applying oscillatory forces to the turret.

The shaker mechanism is advantageous in that it avoids the need for a test track (proving ground). Also, the shaker can be operated continuously on a 24 hour basis, thus enabling a given test to be performed in a relatively short period of time. Additionally, the shaker can be used with any given program over and over again, thereby permitting the test associated with that particular program to be precisely duplicated and repeated; this enables the same test to be applied to different tank turret assemblies for deriving comparative performance data.

The shaker mechanism comprises an annular horizontal support platform having means on its upper surface for holding the conventional turret ring mechanism. The turret basket (if used) extends downwardly through the central space circumscribed by the support structure. At three equidistant points around the perimeter of the platform structure there are ball joint connections to vertically-oriented hydraulic cylinder power units. By selectively energizing the three hydraulic cylinder units in their respective motion planes (at selected speeds) it is possible to tilt the turret into various different planes, thus simulating the effect of actual tank motion over rough terrain. Programs can be devised to simulate the effect of different terrain conditions and different vehicle speeds.

A principal aim of the invention is to provide a shaker apparatus that is an improvement on the apparatus shown in U.S. Pat. No. 3,295,224 to K. L. Cappel.

Particular objects of the invention are to provide a shaker apparatus wherein:

a. only a relatively simple programmer system is required to control the shaker apparatus.

b. the shaker apparatus is powered by fluid cylinders having relatively short strokes.

c. only a relatively small number of fluid cylinders are required, d. the fluid cylinders are oriented and supported to minimize buckling or flexing of the piston rods.

e. the shaker apparatus imparts both vertical oscillatory forces and rotational oscillatory forces to the turret.

f. the vertical and rotational oscillatory forces are separately programmed.

g. the fluid cylinders are supported so that two relatively small diameter cylinders can be used at each of three platform-support points (in lieu of one large diameter cylinder).

THE DRAWINGS

DETAILED DESCRIPTION OF THE DRAWINGS

Figure 1:
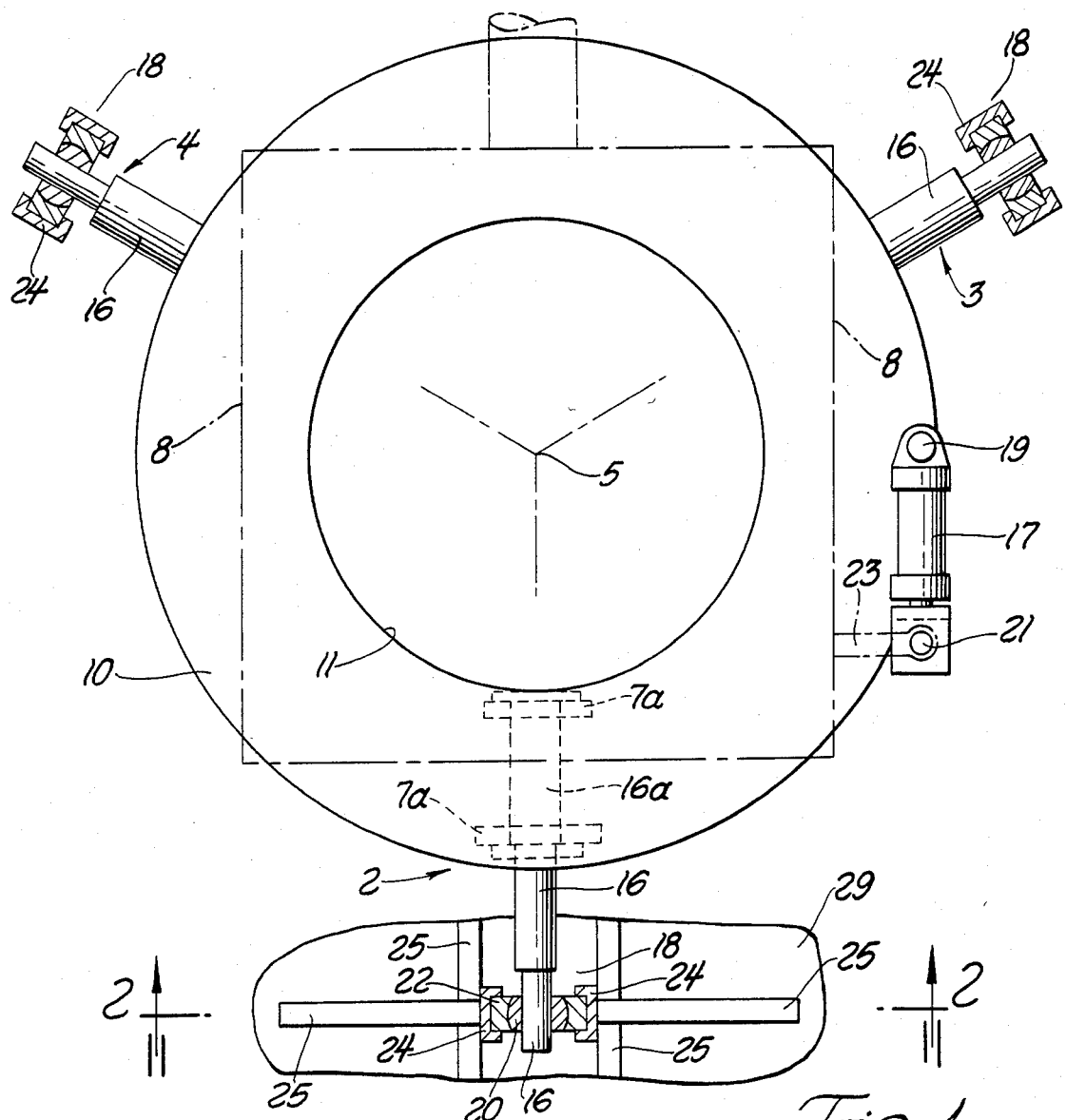
FIG. 1 is a top plan view of a motion simulator embodying my invention.
Figure 2:
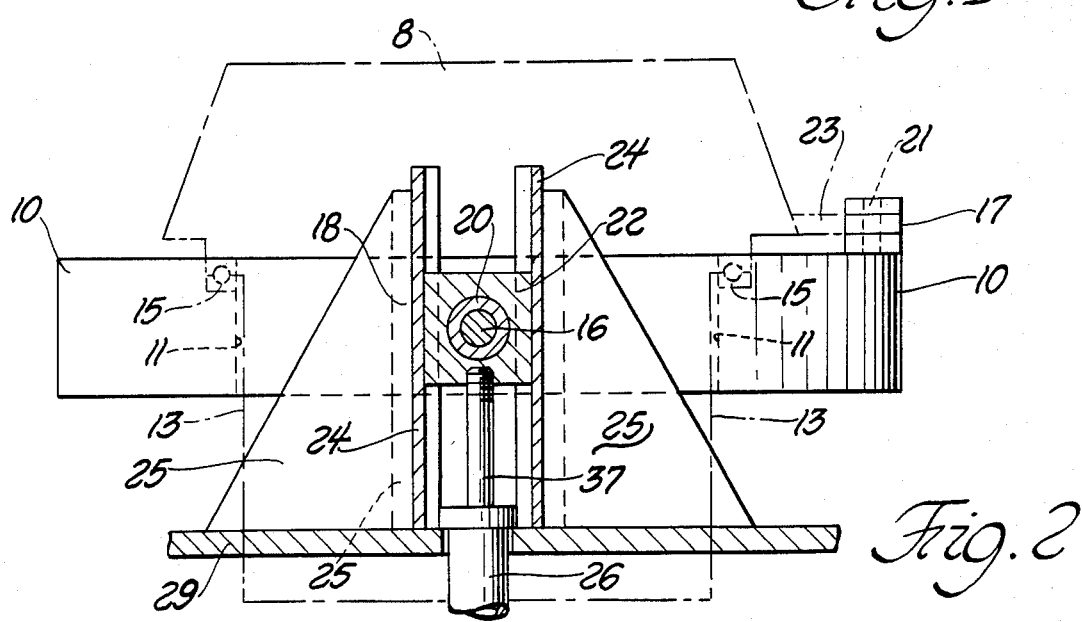
FIG. 2 is a sectional view taken along line 2—2 in FIG. 1.

Referring in greater detail to FIGS. 1-2 there is shown a circular annular support platform 10 having a large aperture 11 sized to accommodate a circular basket 13 that depends from a conventional tank turret structure 8. In a typical situation the turret-basket assembly might weigh upwards of ten tons; the basket would have a diameter on the order of seventy inches. The turret may be rigidly clamped or bolted to platform 10. However, as shown in FIG. 2, the turret is provided with a conventional anti-friction race structure 15 disposed in an annular recess in the platform upper surface, whereby the turret-basket assembly can rotate relative to the platform.

The turret-basket assembly can be powered in the rotational azimuth plane by means of the same motorized gear-rack mechanism that is used in the actual tank. Alternately, the turret-basket assembly can be powered in the rotational direction by means of one or more fluid cylinder power units 17. As seen in FIGS. 1 and 2, a representative power unit comprises a fluid cylinder having a pivot connection 19 with platform 10; the piston rod has a pivot connection 21 with an arm 23 extending from turret 8.

Three horizontal shafts 16 project outwardly from platform 10 into ball joint connections 18. Each ball joint connection comprises a spherical ball element 20 seated within a socket in a slidable two-piece block 22; stationary guides 24 support block 22 for vertical oscillatory motion under the impetus of a conventional double-acting hydraulic cylinder 26. The end area of each shaft 16 is slidable in a hole through the center of spherical element 20. Guides 24 are suitably reinforced with various wall structures 25.

Operation of the shaker mechanism involves selective introduction of hydraulic pressure fluids through the upper or lower ends of the three hydraulic cylinders 26, for thereby tilting support structure 10 into different angulations out of its normal horizontal attitude. Electrically-controlled valves in the fluid supply lines will control the flow of pressurized fluid to/from the cylinders. The valves will be controlled/programmed by means of a programmer tape or disc system (not shown). It should be possible to program different motion distances, different motion speeds, and different motion frequencies into the shaker mechanism, thus simulating any given rough terrain condition and/or vehicle speed.

Cylinder (or cylinders) 17 and cylinders 26 can be operated simultaneously or separately. Cylinder(s) 17 is/are intended to test turret componentry under high acceleration/deceleration forces representative of actual field conditions (even though the turret rotates only a few degrees for each actuation of cylinder 17).

FIG. 2 illustrates the normal at-rest position of the shaker apparatus in which platform 10 has a horizontal disposition. One or more of the fluid cylinders 26 can be actuated to move the associated piston rod 37 upwardly or downwardly. By moving one piston rod upwardly (or downwardly) it is possible to tilt the platform out of its normal at-rest position; during such an operation ball element 20 swivels within the socket defined by block element 22, while at the same time shaft 16 slides in the central opening formed through element 20.

Each ball-socket assembly cooperates with the associated fluid cylinder 26 to define a support structure for platform 10. The three support structures, identified by numerals 2, 3 and 4, are spaced equidistantly around the circumference of the platform such that each support structure carries a portion of the platform load. Each shaft 16 extends into the platform, as shown at 16A in FIG. 1; lateral reinforcements 7A and 7A are provided for shaft sections 16A, to reinforce the shaft against bending or disconnection from platform 10. The platform is a hollow structure made up of various plates and reinforcement elements, not shown in FIG. 1. Various reinforcing structures can be used to rigidify the platform.

The three support structures 2, 3 and 4 cooperatively center platform 10 so that it can maintain its position centered at imaginary centerpoint 5 (FIG. 1) while undergoing the desired vertical oscillations and/or tiltable oscillations. Any tendency for the platform to move toward or away from any one support structure is resisted by the other two support structures.

Figure 3:
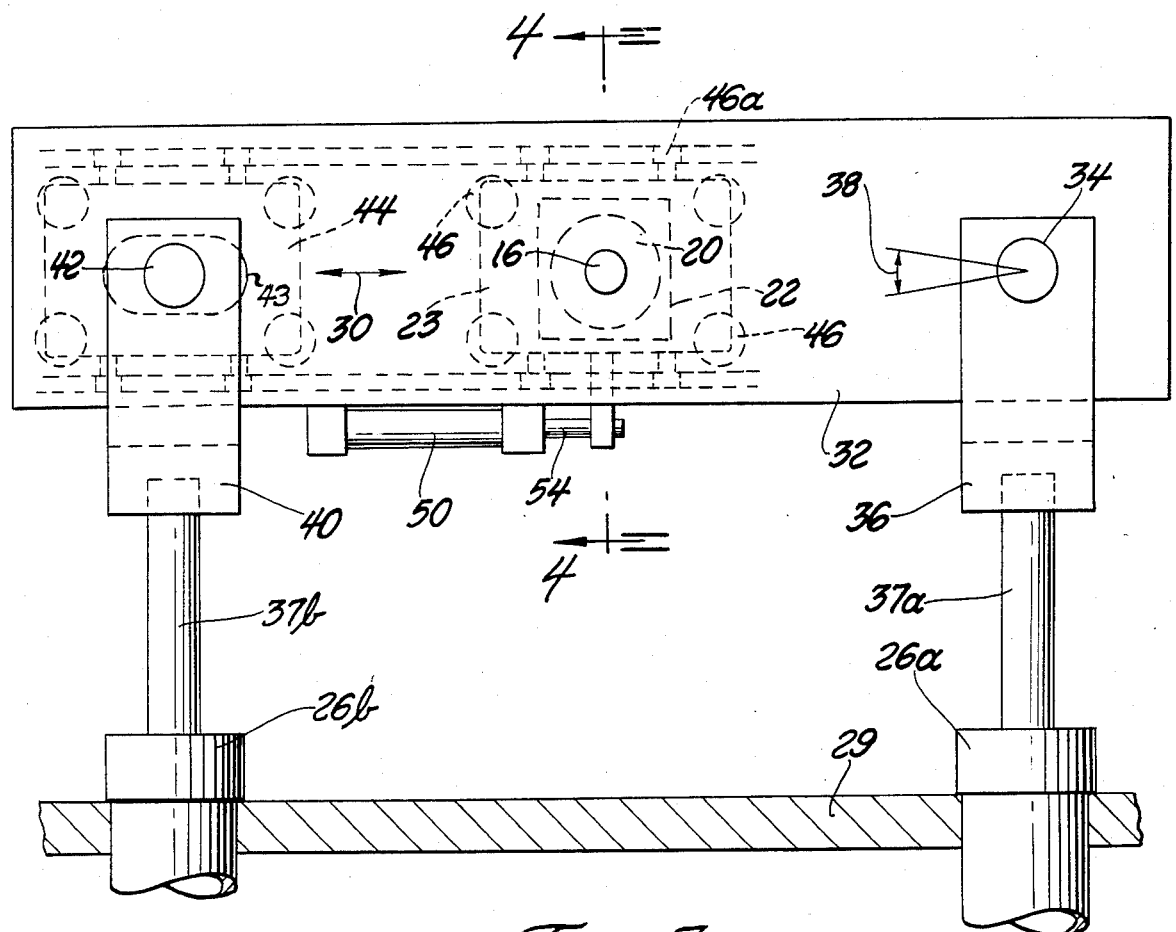
FIG. 3 is an elevational view of a support structure utilized in a second embodiment of the invention.
Figure 4:
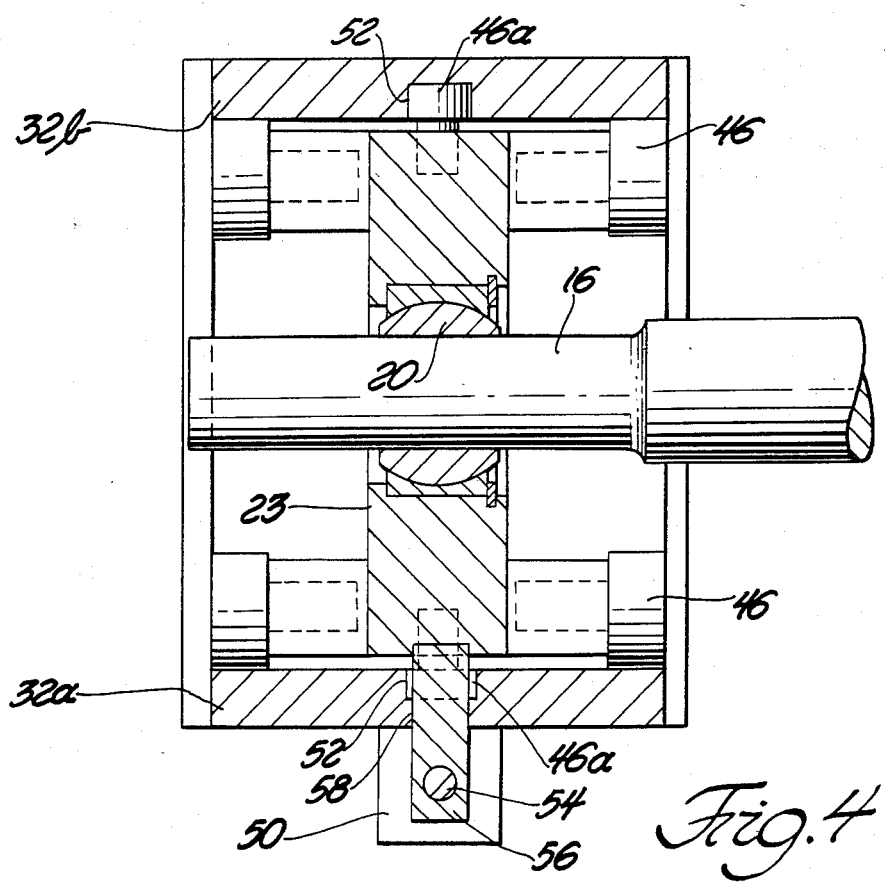
FIG. 4 is a sectional view taken along line 4—4 in FIG. 3.
Figure 5:
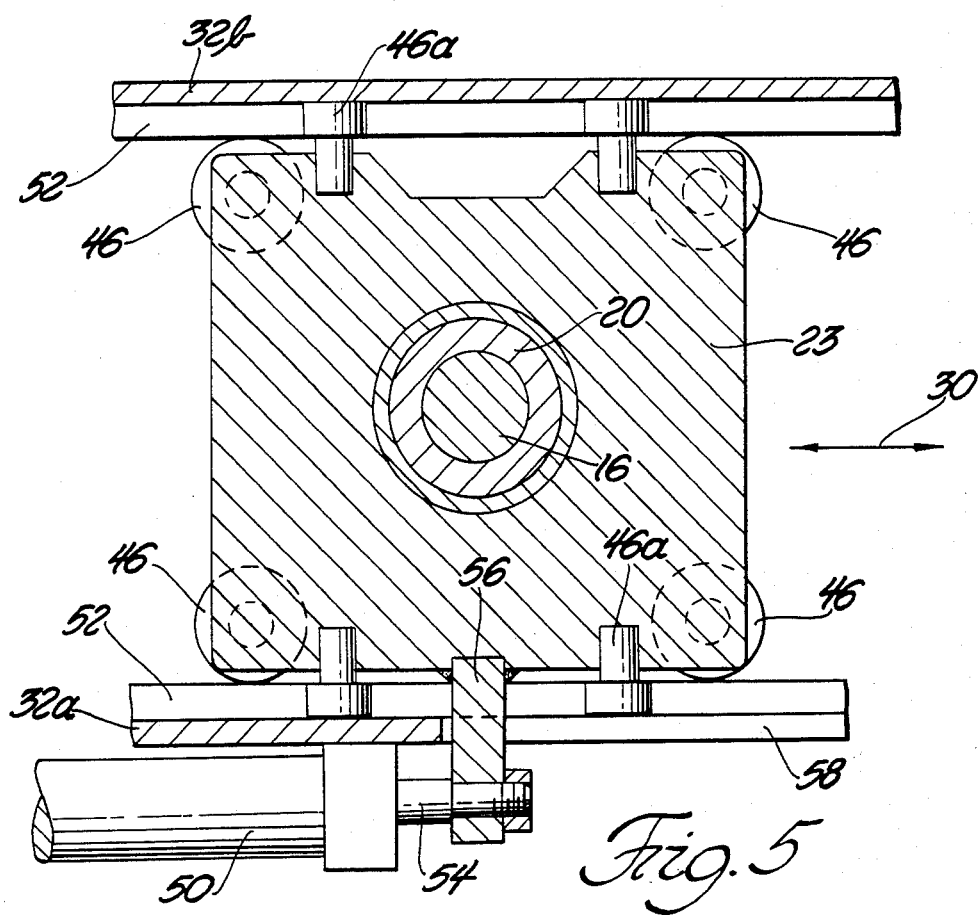
FIG. 5 is a sectional view taken along line 5—5 in FIG. 4.

FIGS. 3, 4 and 5 illustrate a variant of the invention wherein each individual shaft 16 is moved vertically by means of two hydraulic cylinders 26a and 26b (rather than a single cylinder). The FIG. 3 arrangement would be used where it would be difficult to obtain hydraulic cylinders in the large sizes necessary to support heavy tank turrets (e.g. above 10 tons). Six small cylinders would be used in lieu of three large cylinders. FIG. 3 shows only one of the three shaft-mount mechanisms; the other two mechanisms would be similarly constructed.

The FIG. 3 system operates so that cylinders 26a and 26b are raised/lowered in unison. However, in event that the load forces cause some lag in motion of one cylinder relative to the other there could be an inadvertent binding or jamming condition. To avoid such a situation the connection between cylinder 26b and the shaft mount mechanism is made so that certain parts of the mechanism can shift transversely, if necessary; arrow 30 illustrates the transverse motion.

The shaft mount mechanism includes a trackway 32. A pivot shaft 34 supports trackway 32 in yoke 36 atop the piston rod 37a so that the trackway can swing around the shaft 34 axis, as designated by arrows 38. The other piston rod 37b carries a yoke 40 that has a pivot shaft 42 extending through a carriage 44; carriage 44 is equipped with various rollers that enable the carriage to move transversely within trackway 32 (as designated by numeral 30). Slot 43 permits carriage 44 motion without interference between shaft 42 and the track 32 wall.

It will be seen that if piston rods 37a and 37b fail to exactly keep in phase (i.e. move in unison) carriage 44 can shift slightly to eliminate any binding tendencies between trackway 32 and the piston rods 37a and 37b.

In the FIG. 3 system shaft 16 is engaged in a ball joint-block unit 20,22 similar to that shown in FIGS. 1 and 2. Block 22 is arranged within a carriage 23 that has various rollers 46 engaged with guide surfaces in trackway 32. The carriage can shift back and forth in trackway 32, if necessary, to compensate for differences in motion between piston rods 37a and 37b.

The FIG. 3 system would be used when the only available hydraulic cylinders are relatively small, i.e. when three hydraulic cylinders would be insufficient to carry the anticipated load. If cylinders of sufficient capacity were available then the FIG. 1 arrangement would be used.

FIGS. 4 and 5 illustrate add-on fluid cylinder power unit 50 for achieving a fast rotational motion of the turret-support platform. The idea is to accelerate (and decelerate) the turret to simulate loading conditions that would occur during the actual operation of slewing the main gun and bringing same to an abrupt halt during firing operations. Cylinder 50 constitutes an alternative to cylinder 17 shown in FIG. 1. If cylinder 50 were used at any or all of the three platform support points the turret would be rigidly clamped to platform 10 (i.e. anti-friction race structure 15 would not be used).

FIGS. 4 and 5 illustrate carriage 23 details. The carriage is mounted for movement in the arrow 30 direction between an upper trackway 32b and a lower trackway 32a. Rollers 46a operate in guide grooves 52 to prevent lateral displacement of carriage 23. The main feature of interest is fluid cylinder 50 having a piston rod 54 suitably affixed to an arm 56 depending from carriage 23. A slot 58 in trackway 32a enables the arm to move in the arrow 30 direction.

The fluid cylinder 50 can be programmed to impart rapid motions to carriage 23 to move the associated shaft in the arrow 30 direction. The complete installation could include three sub-assemblies of the type shown in FIG. 3. Back-and-forth oscillation of the three carriages 23 would produce oscillatory motion of the turret in the azimuth plane. Such oscillatory motion could be made to take place while the other cylinders 26a and 26b (FIG. 3) were producing turret oscillations in vertical (elevational planes).

Figure 6:
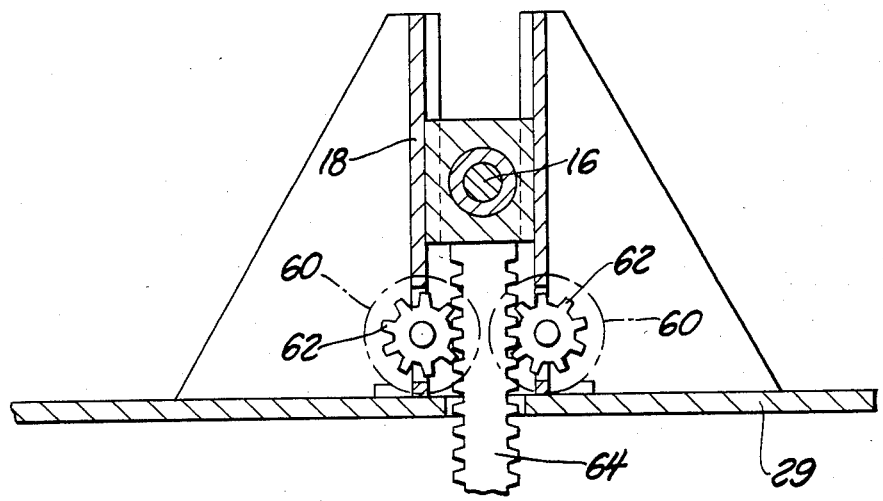
FIG. 6 is a fragmentary elevational view depicting another embodiment of the invention.

FIG. 6 illustrates a variant of the structure shown in FIG. 2. In this case the fluid cylinder 26 is replaced with a gear-rack assembly. Two electric (or hydraulic) motors 60 drive gears 62 that are engaged with a rack 64 depending from ball joint connection 18. The support structure shown in FIG. 6 would be used for each of the three support shafts 16 (FIG. 1).

The preferred embodiments of FIGS. 1 through 5 are believed to have advantages over the apparatus disclosed in U.S. Pat. No. 3,295,224 to K. L. Cappel. In the Cappel patented apparatus six fluid cylinder units are required to achieve oscillatory motion of the support platform; in my apparatus, as shown in FIGS. 1 and 2, only three fluid cylinder units are required. The six fluid cylinder units of Cappel require a relatively complex programmer control system compared to the control system required with my proposed apparatus (six control tracks versus three control tracks).

In my proposed apparatus the main fluid cylinders (26 or 26a, 26b) are oriented vertically, such that platform 10 motion in the vertical direction is equivalent to the piston stroke. In the Cappel patented apparatus the fluid cylinder units are obliquely oriented such that motion of the platform in the vertical direction is less than the piston stroke distance; for a given platform motion distance Cappel requires longer (larger) fluid cylinder mechanisms.

The fluid cylinder units 26 or 26a, 26b in my proposed arrangement are rigidly mounted on stationary base plates 29 (FIGS. 2 and 3) located near the upper ends of the cylinders. This arrangement tends to minimize possible buckling or flexing of the piston rods. In contrast, Cappel mounts the fluid cylinder units by means of pivot joints at the lower ends of the cylinders and upper ends of the pistons. The cylinder-piston units have relatively great lengths devoid of lateral reinforcement, such that buckling or flexing of the piston rods is a much greater problem with the Cappel apparatus (when compared to my proposed apparatus).

In my proposed apparatus the supported turret is rotated and/or oscillated vertically by separate power mechanisms 17 and 26. The rotational movement can be programmed separately from the vertical oscillation movement. The system proposed by Cappel has no provision for a separately programmed rotary motion of the device being tested.

I wish it to be understood that I do not desire to be limited to the exact details of construction shown and described for obvious modifications will occur to a person skilled in the art, without departing from the spirit and scope of the appended claims.

I claim:
1. A turret motion simulator comprising a platform on which the turret is to be mounted; three platform support structures spaced equidistantly around the circumference of the platform; each support structure comprising a ball-socket means having a transverse opening extending through the ball center, a shaft extending from the platform through the opening in the ball, and power means for oscillating the ball-socket means in a vertical direction; the three power means being selectively actuatable whereby the platform can undergo vertical and/or tilting motions; each shaft being oriented to the associated ball-socket means such that the shaft can slide on the ball in the direction of its length, and the ball can swivel in the socket about the ball center.

2. The turret motion simulator of claim 1 wherein each power means comprises two vertically-oriented fluid cylinders energizable from a common power source.

3. The turret motion simulator of claim 2 wherein each fluid cylinder in a given power means comprises a stationary cylinder and a movable piston rod; the combination further comprising a ball-socket means support structure interconnecting end portions of the piston rods.

4. The turret motion simulator of claim 3 wherein each ball-socket means support structure constitutes a trackway permitting horizontal adjustment of the ball-socket means therealong.

5. The turret-motion simulator of claim 4, and further comprising an auxiliary power unit trained between each trackway and the associated ball-socket means for oscillating said ball-socket means back and forth along the trackway, whereby the turret undergoes rotational motion in addition to the previously mentioned vertical and tilting motions.

6. The turret motion simulator of claim 4 wherein each power means includes a pivot connection means between one of the piston rods and the trackway, and a slidable connection means between the other piston rod and the trackway, whereby motion differences between the two piston rods produce movement of the slidable connection means along the trackway.

7. The turret motion simulator of claim 6 wherein each said slidable connection means comprises a carriage pivotably connected to the associated piston rod, each said carriage being rollably positioned on the associated trackway for movement therealong.

8. The turret motion simulator of claim 1 wherein the platform is an annular structure having a central opening sized to accommodate a basket structure depending from the turret.

9. The turret motion simulator of claim 1 wherein each power means comprises a vertically-oriented fluid cylinder means suspended from a point near its upper end.

10. A turret motion simulator comprising a platform on which the turret is to be mounted; three platform support structures spaced equidistantly around the circumference of the platform; each support structure comprising a shaft extending from the platform in a radial direction measured from the platform central axis, a stationary fluid cylinder means having piston rod means movable linearly in vertical directions, and a universal joint means interconnecting the associated shaft and piston rod means; the shaft being capable of sliding motion on the universal joint means in the direction of its length while the piston rod means moves the universal joint means linearly in vertical directions; the three fluid cylinder means being selectively actuable whereby the platform can undergo vertical and/or tilting motions.

11. The turret motion simulator of claim 10 wherein each stationary fluid cylinder means comprises two fluid cylinders energizable from a common power source.

12. The turret motion simulator of claim 10 wherein each stationary fluid cylinder means comprises two fluid cylinders energizable from a common power source; the two fluid cylinders having individual piston rods and an interconnecting trackway; each universal joint means being capable of adjusting motions along the trackway.

13. The turret motion simulator of claim 12 and further comprising an auxiliary power unit trained between each trackway and the associated universal joint means for oscillating said joint means along the trackway, whereby the turret undergoes rotational motion.

* * * * *